(12) United States Patent
Shivers (10) Patent No.: US 10,974,129 B2
(45) Date of Patent: Apr. 13, 2021

(54) FOOTBALL BOARD GAME

(71) Applicant: Jermaine Lajuan Bay Shivers, Cincinnati, OH (US)

(72) Inventor: Jermaine Lajuan Bay Shivers, Cincinnati, OH (US)

(*) Notice: Subject to any disclaimer, the term of this patent is extended or adjusted under 35 U.S.C. 154(b) by 0 days.

(21) Appl. No.: 16/460,347

(22) Filed: Jul. 2, 2019

(65) Prior Publication Data

US 2020/0101370 A1 Apr. 2, 2020

Related U.S. Application Data

(60) Provisional application No. 62/693,645, filed on Jul. 3, 2018.

(51) Int. Cl.
*A63F 3/00* (2006.01)
*A63F 3/02* (2006.01)
*A63F 13/23* (2014.01)
*A63F 13/30* (2014.01)

(52) U.S. Cl.
CPC ...... *A63F 3/00041* (2013.01); *A63F 3/00697* (2013.01); *A63F 3/02* (2013.01); *A63F 13/23* (2014.09); *A63F 13/30* (2014.09); *A63F 2003/00835* (2013.01); *A63F 2003/00996* (2013.01); *A63F 2300/1025* (2013.01); *A63F 2300/40* (2013.01)

(58) Field of Classification Search
None
See application file for complete search history.

(56) References Cited

U.S. PATENT DOCUMENTS

| | | | | |
|---|---|---|---|---|
| 5,356,152 A * | 10/1994 | Curry | ................... | A63F 3/00041 273/247 |
| 6,428,006 B1 * | 8/2002 | Stewart | ............... | A63F 3/00041 273/247 |
| 7,036,820 B2 * | 5/2006 | Macomber | .......... | A63F 3/00697 273/247 |
| 7,159,867 B2 * | 1/2007 | Huley | ................. | A63F 3/00028 273/247 |
| 8,740,684 B1 * | 6/2014 | Tencza, Jr. | ............... | A63F 13/44 273/236 |
| 10,632,364 B2 * | 4/2020 | Braun | ................. | A63F 3/00041 |

* cited by examiner

*Primary Examiner* — Ronald Laneau
(74) *Attorney, Agent, or Firm* — Jenei LLC (57) ABSTRACT

A football-style chess game and method for opposed players includes an eight-by-eight checkerboard-style game board having an End Zone at each player end of the board, two sets of game pieces, each set including conventional chess pieces, e.g. a Quarterback (QB), a Fullback (FB), a Running Back (RB), a Wide Receiver/Defensive Back (WR/DB), a Linebacker (LB), and eight Front Line (FL) pieces. A method is also disclosed wherein the chess game is played for a fixed duration of time, and points (dollar values) are awarded to the players. The player having the highest cumulative point total at the end of the game is then declared the winner. A method is also disclosed for adapting the chess game for play electronically, such as through a global network of computers.

18 Claims, 7 Drawing Sheets

FOOTBALL BOARD GAME

CLAIM OF PRIORITY UNDER 35 U.S.C. § 119

The present application for patent claims priority to Provisional Application No. 62/693,645 to Shivers entitled "Football Board Game" filed 3 Jun. 2018, and assigned to the assignee hereof and hereby expressly incorporated by reference herein in its entirety.

BACKGROUND OF THE INVENTION

1. Field of the Invention

The field of art disclosed herein pertains to games, and more particularly for educational games played with chess pieces.

2. Description of the Related Art

Chess is a game played between two players who each move their own game pieces around a board. A traditional chess board has sixty-four squares, of alternating colors, typically light and dark, arranged into eight rows and eight columns.

Each player has a set of game pieces that the player can move during his turn, with each game piece having a specific set of permissible movement patterns. The players take turns moving game pieces one at a time in an attempt to capture the other player's game pieces. A player can win the game by moving his game pieces such that the other player's game piece known as the king cannot be moved without being placed in a position in which the king could be captured, a situation known as checkmate.

Typically, the pawns and game pieces are white and black, although other colors may be used as well. The pawns and pieces will be referred to in this application generically as pieces and the sets of pieces will be referred to as white pieces and black pieces. In this application, chess set game will be considered to include a chess set and a chess board. The chess set will include two sets of chess pieces (white and black) and a container for the chess pieces.

The standard rules of chess can be found at http://www.chess.com/learn-how-to-play-chess.html (last accessed Jun. 24, 2019), herein incorporated by reference.

By rule, each game piece in classic chess has limitations placed upon its movement. For example, the King generally may move one square in any available direction (e.g. horizontally, vertically, or diagonally). The Queen may move through any number of unobstructed squares in any straight line (e.g. horizontally, vertically or diagonally). The Queen may not jump other pieces. The Rook may move through any number of unobstructed squares in a straight line, either horizontally or vertically. The Rook may not jump other pieces. The Bishop may move through any number of unobstructed squares in any straight diagonal line. The Bishop may not jump other pieces. The Knight makes a move which consists of a first one-square step in either a horizontal or a vertical direction, and a second one-square step diagonally. The Knight may jump other pieces. With the following two exceptions, the Pawn may only move forward one square. First, on its initial move, the Pawn may move forward one or two squares. Second, the Pawn captures other pieces by moving one square diagonally.

In addition to classical chess, many alternative versions of chess have developed through the years. For example, U.S. Pat. Nos. 5,449,178, 5,421,582, 5,275,414, 5,257,787, 5,011,159, 4,856,789, and 4,778,187 disclose exemplary variations on conventional chess.

Although players can employ numerous and sometimes complicated strategies during gameplay depending on the situation and the arrangement of the game pieces on the game board, the player is limited to moving each game piece according to that game piece's set of permissible movement patterns and the traditional rule of chess. Some players may wish to play a variation on the game that is similar to chess but introduces different rules and different game pieces that have different permissible movement patterns.

Regular chess board images are for battles in war, but do not allow for a challenge in sports with images related to the most popular sport in America. Presently there is no alternative attraction solution to revitalize chess to school age school student with mental challenges.

Although conventional chess and some of its variations have achieved notoriety and respect from fans and players alike, a need exists for a new and improved chess variation to provide new challenges to conventional capture strategies. The present invention is a new board game that utilizes chess game pieces. However, the present invention game is played with game pieces replacing the standard chess pieces with football players positions. The novel game provides for an easier way to advance basic mathematics skills and improve school students' test scores. The present invention teaches the importance of analytical thinking skills and aids in memory retention. The present invention is a great confidence builder and teaches patience and persistence. The present invention also teaches safety thinking while playing sports and operating a banking system.

SUMMARY OF THE INVENTION

In one aspect, the present disclosure provides a playing game that is a board game assembly and its associated method of play. The board game assembly contains a game board that is divided into different areas. Playing spaces are on the game board and extend throughout the various areas.

In one or more embodiments, the board is the design of a football field with yard number yards lines and outlines of a football field. The 32 pieces have numeric (monetary) value and special capabilities.

The present invention presents a football-style chess game and method for playing the same. The game is played by opposed players or groups of players on an eight-by-eight checkerboard-style game board having an end zone (red zone) on each player end. Each player begins the game with a total of sixteen playing pieces: a Quarterback (QB), a Fullback (FB), a Running Back (RB), a Wide Receiver/Defensive Back (WR/DB), a Linebacker (LB) and eight Front Line (FL) pieces. As with conventional chess, the players alternatively move their pieces. However, the time allotted for any given move is limited by rule. Further, the overall game length is also limited.

The Quarterback (QB), the Fullback (FB), the Running Back (RB), the Wide Receiver/Defensive Back (WR/DB), the Linebacker (LB) and the Front Line (FL) move as in conventional chess. However, the Quarterback (QB) is a novel piece in that the Quarterback (QB) moves in a fashion similar to the King in conventional chess but is able to move into the End Zone/Red Zone in limited circumstances.

To facilitate notation of moves, all squares are given a name. In one embodiment, from the view of the white/light player, the rows are numbered 1, 2, 3, 4, 5, 6, 7, 8; the lowest row has number 1, and the upper row has number 8. There is an End Zone (red zone) at each end on the playing board.

Columns are named, from left to right, a, b, c, d, e, f, g, h. A square gets a name, consisting of the combination of its column-letter and row-number, e.g., the square in the lower left corner (for white/light) is A1.

Alternately, the players make a move, starting with the white/light player (the player that plays with the white/light pieces.) A move consists of moving one of the pieces of the player to a different square, following the rules of movement for that piece—there is one special exception, named castling, where players move two pieces simultaneously.

A player can take a piece of the opponent by moving one of his own pieces to the square that contains a piece of the opponent. The opponents piece then is removed from the board, and out of play for the rest of the game. Taking is not compulsory.)

At the start of the game, the position of the pieces is as follows: at the second row, there are eight white/light Front Line pieces, at the seventh row, there are eight black/dark Front Line pieces. At the first row, from left to right, we have a: Wide Receiver/Defensive Back (WR/DB), Linebacker (LB), Running Back (RB), Fullback (FB), Quarterback (QB), Running Back (RB), Linebacker (LB), and Wide Receiver/Defensive Back (WR/DB). Note that the Fullbacks start of squares of their own color, with a black/dark square in each players left hand corner.

Each game piece has an associated dollar (point) value so long as it remains "in play" during the game. The points are assigned to the game pieces on a sliding scale. For example, each Fullback (FB) which remains "in play" is worth $500,000, each Running Back (RB) is worth $450,000, each Wide Receiver/Defensive Back (WR/DB) is worth $400,000, etc.

The game may be terminated, among other ways, by a player placing the opposing player's Quarterback (QB) in "QB Sacked", or, alternatively, by the expiration of the allotted time. In the latter case, the player with the highest cumulative point total remaining on the board is declared the winner.

In one or more embodiments, other variant moves are permitted under limited circumstances, such as "castling" moves and "en passant" capture moves. Castling involves the simultaneous movement of the Quarterback (QB) and the Wide Receiver/Defensive Back (WR/DB). Several castling moves are known. For example, in one castling move the Quarterback (QB) moves horizontally along a row two squares inward toward the Wide Receiver/Defensive Back (WR/DB), and the Wide Receiver/Defensive Back (WR/DB) moves horizontally over and beyond the Quarterback (QB) to the next adjacent square in that row. An "en passant" capture is a move executed by the Front Line (FL) in which the Front Line (FL) attacks an opposing Front Line (FL), the opposing Front Line (FL) having just been advanced two squares from its original square in one move. In such circumstances, the attacking Front Line (FL) may move diagonally one square into the square passed over by the opposing Front Line (FL) and capture the Front Line (FL).

These and other features are explained more fully in the embodiments illustrated below. It should be understood that in general the features of one embodiment also may be used in combination with features of another embodiment and that the embodiments are not intended to limit the scope of the invention.

BRIEF DESCRIPTION OF THE DRAWINGS

The various exemplary embodiments of the present invention, which will become more apparent as the description proceeds, are described in the following detailed description in conjunction with the accompanying drawings, in which.

DETAILED DESCRIPTION

Certain terminology is used in the following description for convenience only and is not limiting. Unless specifically set forth herein, the terms "a", "an" and "the" are not limited to one element but instead should be read as meaning "at least one". The words "right," "left," "lower," and "upper" designate directions in the drawings to which reference is made. The words "inwardly" or "distally" and "outwardly" or "proximally" refer to directions toward and away from, respectively, the geometric center or orientation of the device and instruments and related parts thereof. The terminology includes the above-listed words, derivatives thereof and words of similar import.

It should also be understood that the terms "about," "approximately," "generally," "substantially" and like terms, used herein when referring to a dimension or characteristic of a component of the invention, indicate that the described dimension/characteristic is not a strict boundary or parameter and does not exclude minor variations therefrom that are functionally the same or similar, as would be understood by one having ordinary skill in the art. At a minimum, such references that include a numerical parameter would include variations that, using mathematical and industrial principles accepted in the art (e.g., rounding, measurement or other systematic errors, manufacturing tolerances, etc.), would not vary the least significant digit.

present invention presents a football-style chess game and method for playing the same. The game is played by opposed players or groups of players on an eight-by-eight checkerboard-style game board having an end zone (red zone) on each player end. Throughout this specification the term "player" can include a single individual or a team.

The game is played between two players who each move their own game pieces around a board. A traditional chess board has sixty-four squares, of alternating colors, typically light and dark, arranged into eight rows and eight columns.

The colors of the sixty-four squares alternate and are referred to as "light squares" and "dark squares". The game board is placed with a light square at the right-hand end of the rank nearest to each player.

Turning now to the drawings, the detailed description set forth below in connection with the appended drawings is intended as a description of various configurations and is not intended to represent the only configurations in which the concepts described herein may be practiced. The detailed description includes specific details for the purpose of providing a thorough understanding of various concepts with like numerals denote like components throughout the several views. However, it will be apparent to those skilled in the art that these concepts may be practiced without these specific details. In some instances, well-known structures and components are shown in block diagram form in order to avoid obscuring such concepts.

Figure 1:
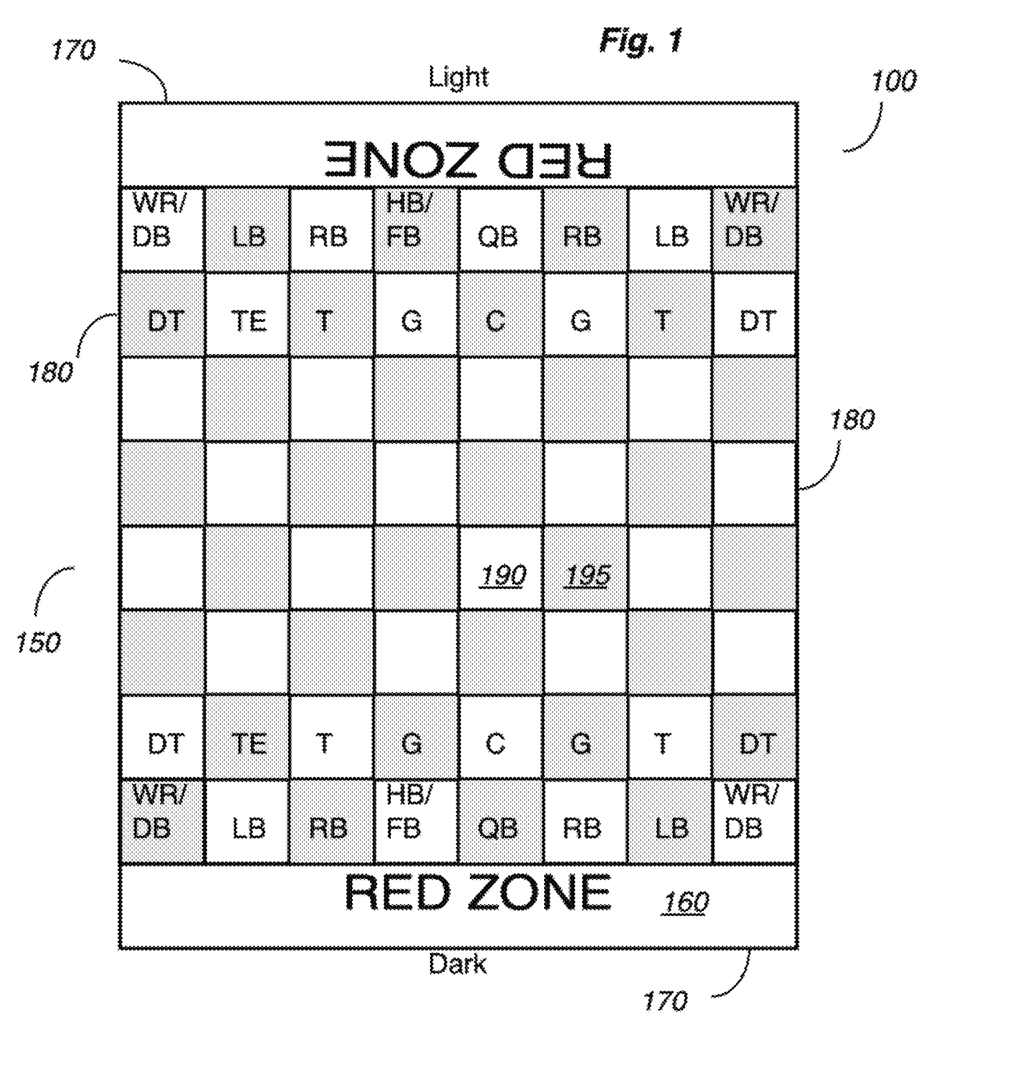
FIG. 1 illustrates a diagram of the game board showing the placement of the game pieces.

Referring to the drawings and FIG. 1 in greater detail, the reference numeral 100 generally refers to a novel chess game embodying the present invention. The game 100 incorporates the basic rules of conventional chess as modified herein. Preferably, the game 100 is played on a game board 150 having opposed ends 170 and opposed sides 180. The game board 150 comprises a grid of sixty-four alternating white/light 190 and black/dark 195 colored squares which form a checkerboard pattern.

The game board 150 has eight horizontal rows or "ranks," and eight vertical columns or "files." In addition, each end 170 of the game board 150 has an End Zone or Red Zone 160. Each rank is defined as the adjacent horizontal squares which extend between the sides 180.

Figure 2:
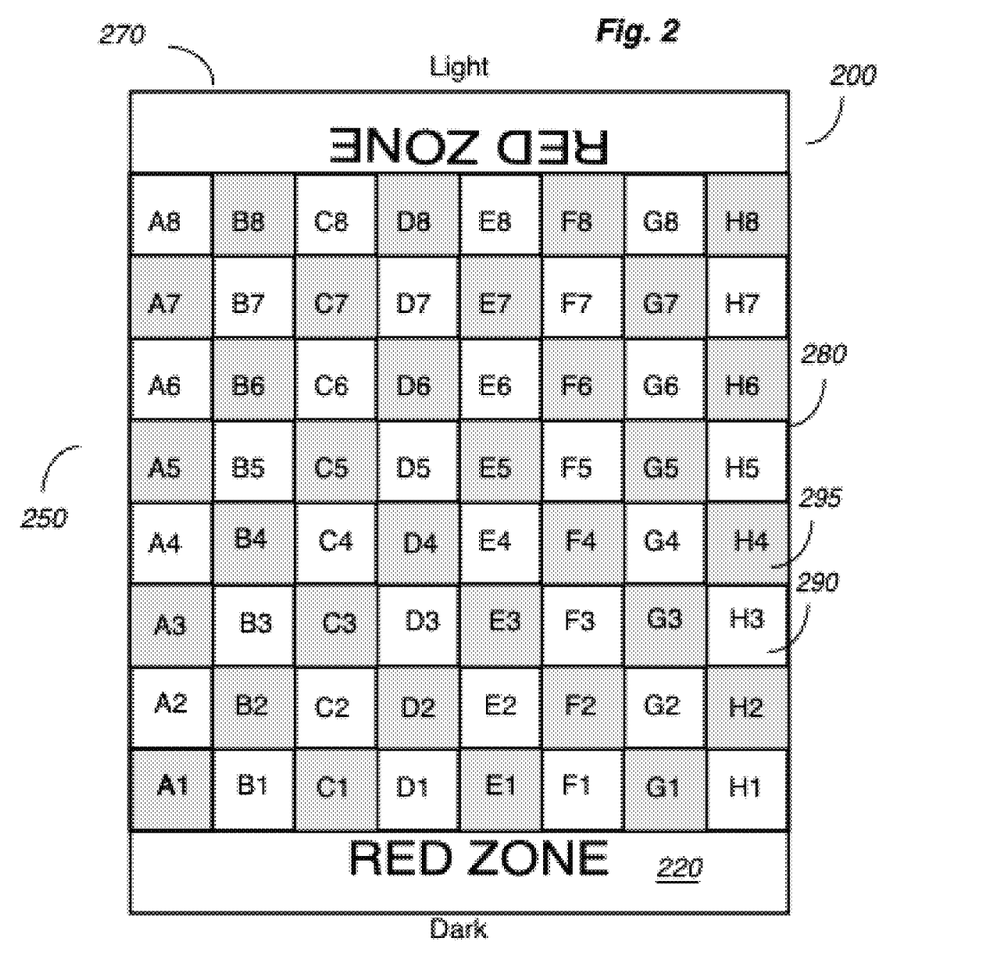
FIG. 2 illustrates a diagram of the game board showing the arrangement of spaces and coordinates of the spaces on the game board.
Figure 3A:
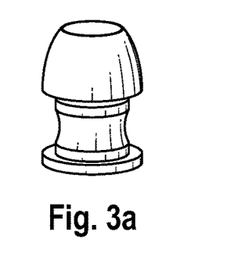
FIGS. 3a through 3n illustrate various depictions of game pieces.
Figure 3B:
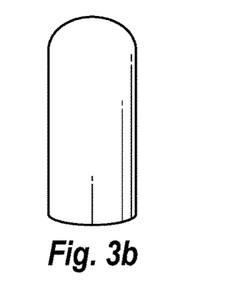
Figure 3C:
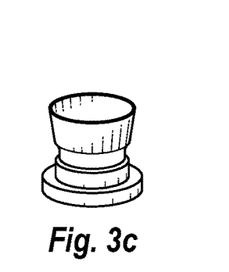
Figure 3D:
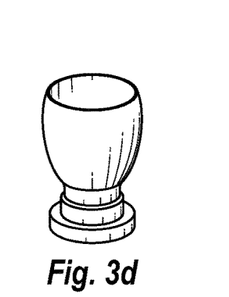
Figure 3E:
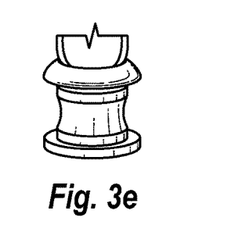
Figure 3F:
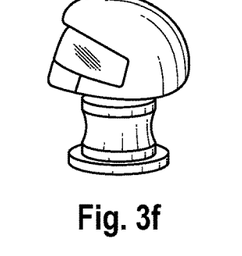
Figure 3G:
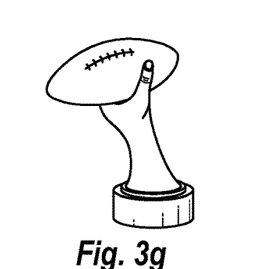
Figure 3H:
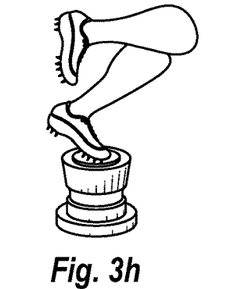
Figure 3I:
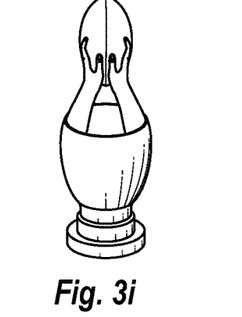
Figure 3J:
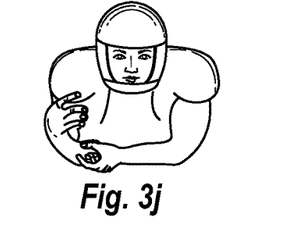
Figure 3K:
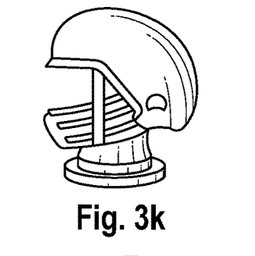
Figure 3L:
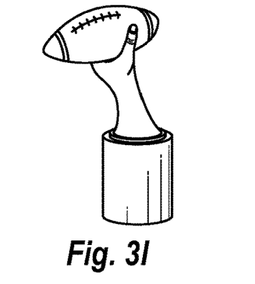
Figure 3M:
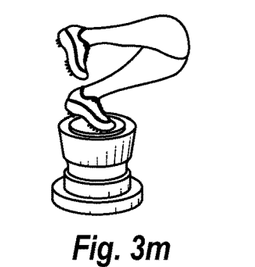
Figure 3N:
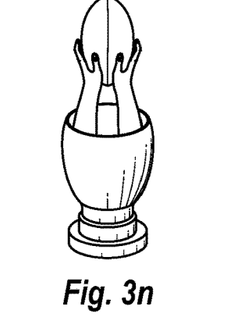

Referring to FIG. 2, each rank is identified numerically (e.g. 1-4 and 4-1 and 10-40 and 40-10, respectively). Each file is defined as adjacent vertical squares 290,295 which extend between the ends 270. Referring to FIG. 2, each file is identified alphabetically (e.g. a-f, respectively).

The game 200 is designed for two players or groups of players, one player being assigned a set of light or white game pieces, and the other player being assigned a set of dark or black game pieces. Each player begins the game 200 with sixteen game pieces as follows: a Quarterback (QB), a Fullback (FB), a Wide Receiver/Defensive Back (WR/DB), a Running Back (RB), a Linebacker (LB) and eight Front Line (FL) pieces.

Pieces of the subject invention are made primarily from solid components. Preferred pieces are primarily made of metal, but may be made wholly or partly of wood, glass, plastic or other materials. Metal components are made of steel, steel coated with zinc or nickel or other metal or material, stainless steel, brass, bronze, copper, and other metals. Plastic components are made of nylon, polyethylene, polypropylene, and other polymers and copolymers.

As shown in FIG. 3, the physical appearance of the game pieces 3a-3n is substantially similar to that of football players or football-related elements, e.g., a football, goal post, etc. In one or more embodiments, the physical appearance of the pieces is substantially similar to that of equivalent pieces in conventional chess.

The Football Chessboard "Football IQ of board games"

The board 250 is divided into columns, rows, and diagonals. In one or more embodiments, the colors of the squares are dark green and lime green like a football field colors. In one or more embodiments, the game board 250 may include outlines of color for goal line and out of bound borders.

In one or more embodiments, the Front Line game pieces may be depicted as football helmets. In one or more embodiments, the game pieces may be depicted as specific football teams such as those from the NCAA and NFL. There's an addition to the board that has an End Zone 220 (Red Zone) at the end 270 of the 10-yard line on each side of the game board 250.

Figure 4:
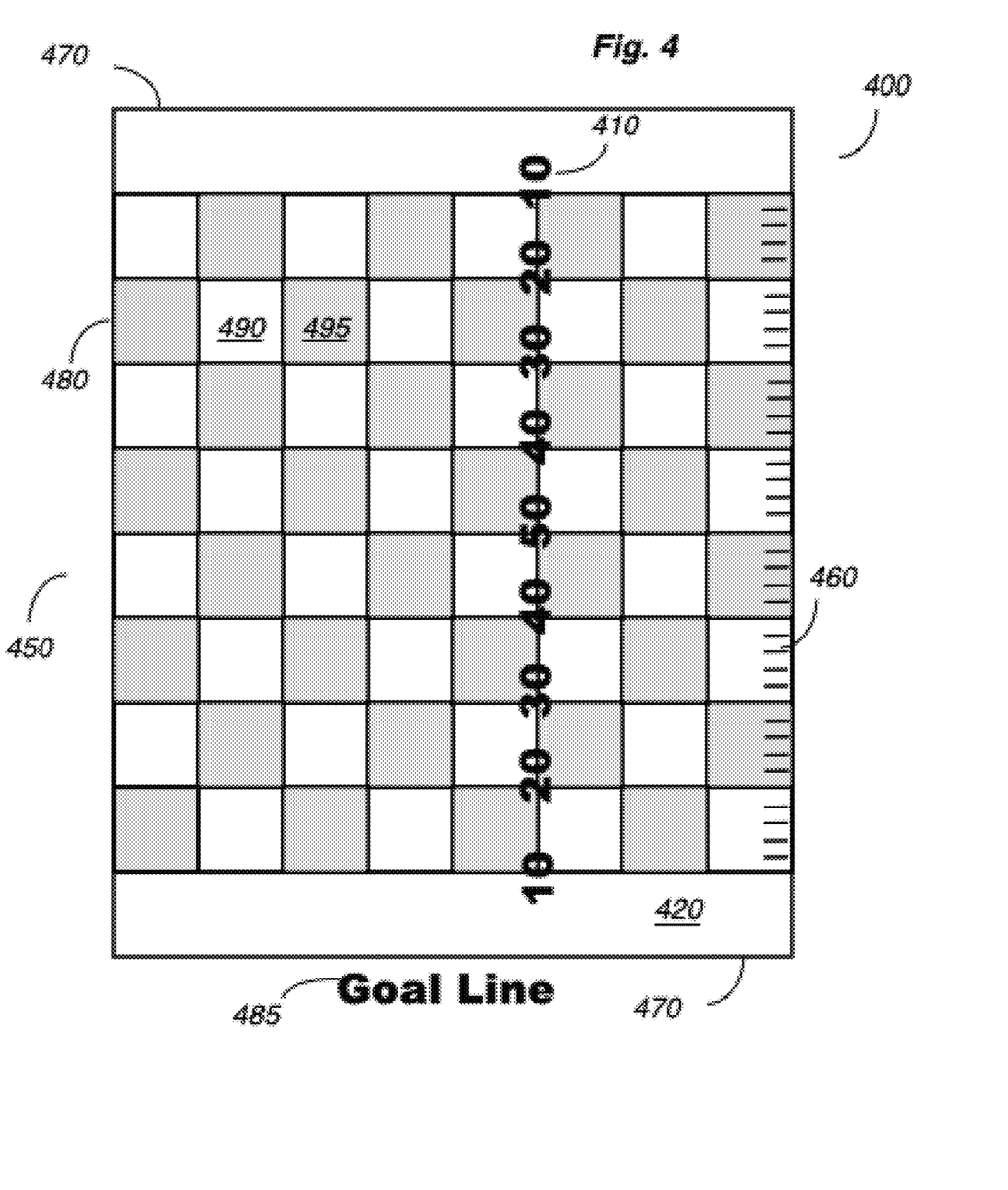
FIG. 4 illustrates a diagram of the game board showing the placement of yard line numbering for the 50, 40's, 30's, 20's and 10's on the gameboard along with hash marks for marking yards between the whole numbers on the gameboard.

As shown in FIG. 4, the game board 450 may include markings as found on a football field. For example, starting from the middle of the field there's a 50-yard line. Next to that are the 40-yard line, and then the 30-yard line. Next is the 20-yard line, going toward the 10-yard lines which is the beginning of the End Zone 420 (or Red Zone) at the end 470. In one or more embodiments, the color of the End Zone 420 is red and has additional ½ rectangles (for example, in FIGS. 1-2). The board 450 layout is shown as 8×8 alternating light 490 and dark 495 spaces (squares) along the sides 480 and having end zones 420 at each end 470. Along the sides 480, between yard lines there are hash marks 460 for the marking yards between the whole numbers 410, which are depicted as 40's, 30's, 20's to the 10's on the board 450. In one or more embodiments, the hash marks, sidelines, and borderlines are colored white; including the inter field lines. In one or more embodiments, the game board 450 may include outlines of color for goal line 485 and out of bound borders. It is understood that other colors may be used without departing from the spirit of the invention.

Referring to FIG. 1 and FIG. 2, the game pieces are initially positioned on the game board 150,250 as follows: the black/dark Quarterback (QB) is positioned on the square having file e, rank 1 (e.g., e1); the black/dark Fullback (FB) is positioned on d1; the black/dark Running Backs are positioned on c1 and f1; the black/dark Linebackers (LB) are positioned on b1 and g1; the black/dark Wide Receivers/Defensive Backs (WR/DB) are positioned on a1 and h1; the black/dark Front Line (FL) pieces are positioned on a2-h2, respectively; the white/light Quarterback (QB) is positioned on e8; the white/light Fullback (FB) is positioned on d8; the white/light Running Backs are positioned on c8 and f8; the white/light Linebackers (LB) are positioned on b8 and g8; the white/light Wide Receivers/Defensive Backs (WR/DB) are positioned on a8 and h8; the white/light Front Line (FL) pieces are positioned on a7-h8, respectively. In the embodiment of FIG. 1, the game board 150 is set up for play by four players. Each player is provided sixteen game pieces of an identifiable color or other identifying decoration or feature.

The game 100,200 commences with the white/light player taking a turn which consists of moving one of his or her pieces. The players then alternate moves or turns. In one or more embodiments, each player must take his or her turn within 15-60 seconds after the opposing player's previous turn. In another embodiment, each player must take his or her turn within 25-40 seconds after the opposing player's previous turn. In one or more embodiments, each player must take his or her turn within 40 seconds after the opposing player's previous turn. In another embodiment, if play has stopped, like for a timeout, then a player has 25 seconds from the time the game clock starts again. In another embodiment, each player must take his or her turn within 40 seconds after the opposing player's previous turn, or that player loses his or her turn. In one or more embodiments, each player must take his or her turn within 40 seconds after the opposing player's previous turn, or that player loses the game 100,200 by default. As discussed more below, the overall length of the game 100,200 is also limited by rule. The objects of the game 100,200 are to checkmate the opposing player's Quarterback (QB) within the allotted time, or, alternatively, and as discussed more below, to finish the game with the highest cumulative point total of game pieces remaining in play.

The present invention concerns a method and apparatus providing a unique board game comprising multi-colored playing pieces (as described below) valued according to a point assignment scheme (described below). The movements of the game pieces during the course of the game 100 are described below.

Specialized Game Pieces

The Quarterback ("QB") "Aka King in Chess"

The quarterback "QB" may move one rectangle in any direction at a time ("QB" is value at $1,000,000 in payment). The "QB" position begins behind the center ("C") in the board. If and when your "QB" is "QB SACK", the game is over. A sack is an attack by one team's game piece on the other team's "QB". If the other team player is attacking your "QB", you are in SACK. A sack may not be ignored: you must immediately get out of the way of sack. There are four different ways of dealing with a sack. A player may choose one of the following plays: (1) tackle (capture) the attacking player; (2) move a different player between the "QB" and the attacking player; (3) move the "QB" to a safe square/rectangle; or (4) move "QB" into the End Zone (Red Zone).

The "QB" can move only one space at a time in any direction. The one exception is that the "QB" moves into the End Zone (Red Zone) in a single move. However, once in the End Zone (Red Zone), the "QB" is able to scramble and move out of the End Zone (Red Zone) into any one of the eight 10-yard squares of the main playing field/board in a single move. Thus, the "QB" may move into the End Zone (Red Zone) in a single move from the E8 square (as shown in FIG. 2) but may scramble and return to the main playing field/board at the A8 square in a single move.

In one or more embodiments, the player may move "QB" into the End Zone (Red Zone) only once in a single game. In other embodiments, the player may move "QB" into the End Zone (Red Zone) 1, 2, 3, 4, or more times in a single game.

The "QB" is limited in some embodiments to capturing a piece only diagonally. In some embodiments the "QB" can capture or defeat an opponent's piece in any direction. In standard play, the "QB" is captured/sacked; this can occur anywhere on the Board.

In one or more embodiments, there is one special type of move, made by a Quarterback (QB) and Wide Receiver/Defensive Back (WR/DB) simultaneously, called castling. Under certain, special rules, a Quarterback (QB) and Wide Receiver/Defensive Back (WR/DB) can move simultaneously in a castling move.

In one or more embodiments, the following conditions must be met:
1. The Quarterback (QB) that makes the castling move has not yet moved in the game.
2. The Wide Receiver/Defensive Back (WR/DB) that makes the castling move has not yet moved in the game.
3. The Quarterback (QB) is not in check.
4. The Quarterback (QB) does not move over a square that is attacked by an opposing/enemy piece during the castling move, i.e., when castling, there may not be an opposing/enemy piece that can move (in case of FL pieces: by diagonal movement) to a square that is moved over by the Quarterback (QB).
5. The Quarterback (QB) does not move to a square that is attacked by an opposing/enemy piece during the castling move, i.e., you may not castle and end the move with the Quarterback (QB) in check.
6. All squares between the Wide Receiver/Defensive Back (WR/DB) and Quarterback (QB) before the castling move are empty.
7. The Quarterback (QB) and Wide Receiver/Defensive Back (WR/DB) must occupy the same rank (or row).

When castling, the Quarterback (QB) moves two squares towards the Wide Receiver/Defensive Back (WR/DB), and the Wide Receiver/Defensive Back (WR/DB) moves over the Quarterback (QB) to the next square, i.e., dark/black's Quarterback (QB) on e8 and Wide Receiver/Defensive Back (WR/DB) on a8 move to: Quarterback (QB) c8, Wide Receiver/Defensive Back (WR/DB) d8 (long castling), light/white's Quarterback (QB) on e1 and Wide Receiver/Defensive Back (WR/DB) on h1 move to: Quarterback (QB) g1, Wide Receiver/Defensive Back (WR/DB) f1 (short castling).

Redzoning is the only move in tackles where a player is allowed to move the Quarterback "QB" into the End Zone (Red Zone) for three downs (plays). Only the Quarterback "QB" may move into the End Zone 160 (Red Zone). However, when the QB is in the End Zone, a player will then have only 3 downs (plays) to get out, so by the beginning of the 4$^{th}$ down (4$^{th}$ play or move), a player must move the QB back onto the main playing area (green field) of the board game. BUT if the player cannot move the "QB" to an unoccupied square/rectangle grid space without having the "QB" in SACK, the "QB" cannot come back on the main playing area (green field), the game is over by "NOT SAFE". Not safe is a condition that the "QB" would get Concussion, career ending injury. NOW "QB SACKED", if your "QB" is in sack and you cannot escape it by any of the four methods explained above, you are in "QB SACKED". "QB SACK" means that the GAME IS OVER and you lose. In one or more embodiments, the value of the "QB" pays out to the winner $1,000,000. The "QB" sacked player loses.

The Fullback ("FB") "Aka Queen in Chess"

The "FB" is the most powerful player in "TACKLES" and combines the movements of "WR/DB" (which are rooks in chess) and "RB" (which are bishops in chess). He can move any number of unoccupied rectangles vertically, horizontally, or diagonally. This player is too valuable to be given up lightly; He needs to be protected from tackling. Losing your "FB" does not lose the game, but it greatly reduces your sacking capacity. In one or more embodiments, the value of "FB" is $500,000 in payment. The "FB" begins his position behind the Guard ("G") between the "QB" and "RB" on the board.

The Running Backs ("RB") "Aka Bishop in Chess"

The "RB" is confined to the diagonals only and cannot move horizontally or vertically. The Running Back (RB) may also not jump over other pieces.

Also, it must always remain on the same color rectangle as the one it starts from. In one or more embodiments, the value of "RB" is $450,000 in payment. The position of "RB" is behind the "G" Guard and "T" lineman Tackle. Next to the "FB" and "LB" (which is Linebackers), The "RB" can tackle any opposing team player and take control of that rectangle (space) and can move any number of unoccupied squares or rectangles (spaces).

The Linebacker ("LB") "Aka Knight in Chess"

The "LB" is the only player capable of jumping over others. A one-two approach is usually used, which means that if the "LB" moves one rectangle horizontally, it must move two rectangles vertically. Alternatively, if the "LB" moves one rectangle vertically, it must then move two rectangles horizontally. The Linebacker (LB) makes a move that consists of first one step in a horizontal or vertical direction, and then one step diagonally in an outward direction. The Linebacker (LB) jumps: it is allowed that the first square that the Linebacker (LB) passes over is occupied by an arbitrary piece. For instance, white/light can start the game by moving his Linebacker (LB) from $B_1$ to $C_3$. The piece that is jumped over is further not affected by the Linebacker (LB): as usual, a Linebacker (LB) takes a piece of the opponent by moving to the square that contains that piece. As long as the destination rectangle is unoccupied by the same team, the "LB" can move to it, but it can tackle the other team player and take control of that rectangle or square (space). Color also matters to the "LB". It oscillates or alternates between colors. If it is on a light rectangle it may only move to a dark rectangle, and vice versa. In one or more embodiments, the "LB" value is $350,000 in payment. His position is between the "RB" and "WR/DB" and behind the lineman tackles "T" and the Tight End on each side.

The Wide Receivers and Defensive Backs ("WR/DB") Aka Rook in Chess.

The "WR/DB" is a powerful piece that may move any number of unoccupied rectangles both horizontally and vertically only. That is, the Wide Receiver/Defensive Back (WR/DB) moves in a straight line, horizontally or vertically. The Wide Receiver/Defensive Back (WR/DB) may not jump over other pieces, that is: all squares between the square where the Wide Receiver/Defensive Back (WR/DB) starts its move and where the Wide Receiver/Defensive Back (WR/DB) ends its move must be empty. As for all pieces, when the square where the Wide Receiver/Defensive Back (WR/DB) ends his move contains a piece of the opponent, then this piece is taken. The square where the Wide Receiver/Defensive Back (WR/DB) ends his move may not contain a piece of the player owning this Wide Receiver/Defensive Back (WR/DB).

The of the "WR/DB" cannot move diagonally. In one or more embodiments, the value of the "WR/DB" is $200,000 each in payment and position behind the Defensive Tackles "DT".

The Front Line ("FL") "Aka Pawns in Chess"

The front line is made up of the Center (C), Guards (G), Tackles (T), Tight Ends (TE). And Defensive Tackles (DT). The Front Line pieces are the only piece that cannot move backward.

The Front Line (FL) moves differently regarding whether it moves to an empty square or whether it takes a piece of the opponent. When a Front Line (FL) does not take, it moves one square straight forward. When this Front Line (FL) has not moved at all, i.e., the Front Line (FL) is still at the second row from the owning players view, the Front Line (FL) may make a double step straight forward. For instance, a white/light Front Line (FL) on $D_2$ can be moved to $D_4$.

In one or more embodiments, there is one special rule, called taking en-passant. When a Front Line (FL) makes a double step from the second row to the fourth row, and there is an enemy Front Line (FL) on an adjacent square on the fourth row, then this enemy Front Line (FL) in the next move may move diagonally to the square that was passed over by the double-stepping Front Line (FL), which is on the third row. In this same move, the double-stepping Front Line (FL) is taken. This taking en-passant must be done directly: if the player who could take en-passant does not do this in the first move after the double step, this Front Line (FL) cannot be taken anymore by an en-passant move.

Front Line (FL) that reach the last row of the board promote. When a player moves a Front Line (FL) to the last row of the board, he replaces the Front Line (FL) by a Wide Receiver/Defensive Back (WR/DB), Linebacker (LB), Running Back (RB), or Fullback (FB) of the same color. Usually, players will promote the pawn to a Fullback (FB), but the other types of pieces are also allowed. It is not required that the Front Line (FL) is promoted to a piece taken. Thus, it is for instance possible that a player has at a certain moment two Fullbacks (FB).

In another embodiment, pieces may be reclaimed by a pawn reaching a back row (row next to opponents Red Zone) whereby the pawn is traded for a previously captured piece. The game piece may be reclaimed and placed at the original starting position, if vacant, however, if a player's or an opponent's piece is located on the reclaimed piece's original location on the board, then it cannot be reclaimed until such time as the original location becomes available.

Therefore, it may move either one or two rectangles forward on its first turn, but afterward it can move only one rectangle at a time. It also captures in a different way than it normally moves. No other players can make that claim. A "FL" can move forward if there is no piece on the rectangle immediately in front of it, but it tackles player's pieces diagonally. In one or more embodiments, the value of the "Front Line" is $100,000 each in payment.

Figure 8:
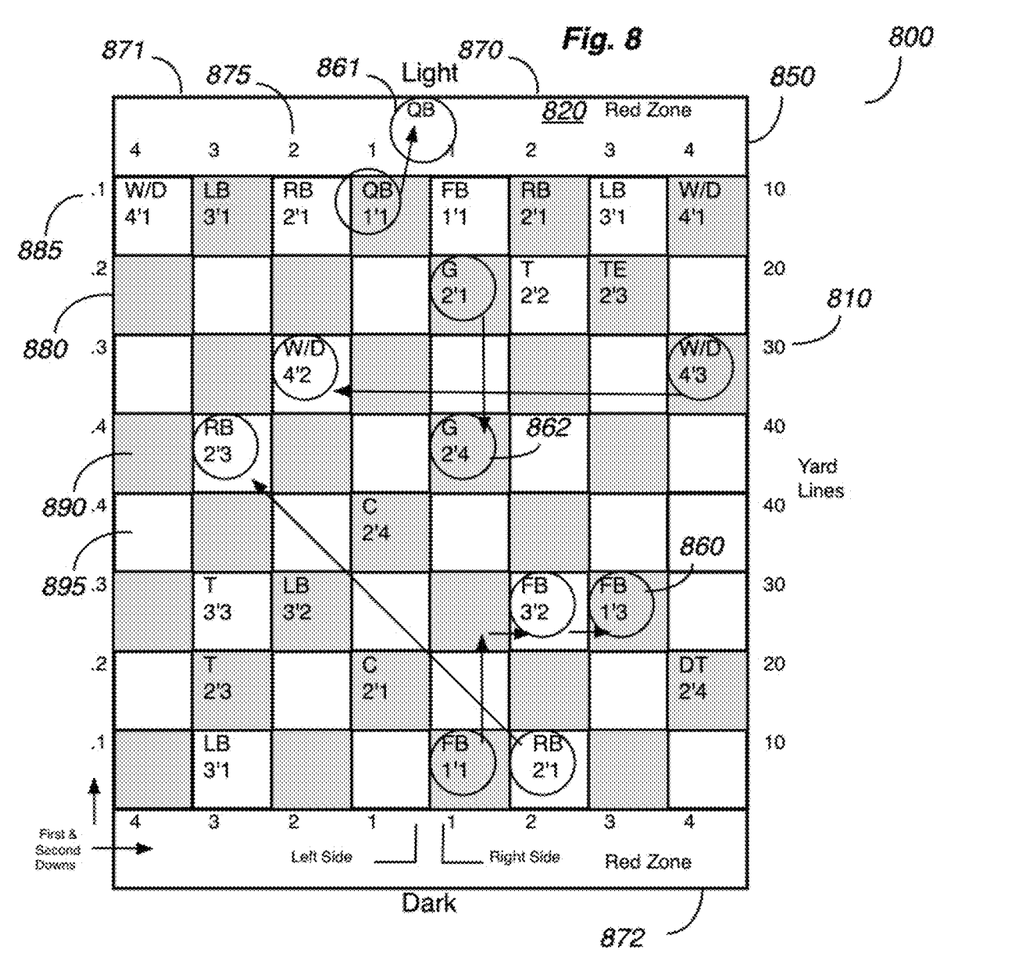
FIG. 8 illustrates an alternate embodiment of the board layout showing a diagram of the game board showing the arrangement of spaces and coordinates of the spaces on the game board wherein a number system of "First and Second" downs (sets of numbers) sharing the space with players positions ("RB" or "LB" etc) and left side and right side including the yard lines.

In one or more embodiments, the game may have less than the full set of game pieces as each player loses various game pieces. Referring to FIG. 8, the game 800 is shown in progress where in alternating turns, the light player at the light player end 871 moves his or her game pieces 860 such as the Quarterback (QB) 861 from the dark square 890 at position 1'1 into the Red Zone 820 of the game board end 870.

FIG. 8, shows an alternate embodiment of the board layout showing a diagram of the game board 850 showing the arrangement of spaces and coordinates of the spaces on the game board wherein a number system of "First and Second" downs 875 (sets of numbers) sharing the space with players positions ("RB" or "LB" etc) and sides 880 including the 10-yard increment yard lines 810 and feet increment lines 885.

The "First and Second" downs 875 (sets of numbers) yield a set of coordinates for the players. For example, the "1" in the red zones 820 under the "FB" represents "first downs", The "2" in the red zones 820 under the "RB" represents "second downs", the "3" in the red zones 820 under the "LB" represents "third downs", and the "4" in the red zones 820 under the "W/D" represents "fourth downs". On one side 880 of the board are feet numbers 885 labeled as 0.1, 0.2, 0.3, 0.4, 0.4, 0.3, 0.2, 0.1. These numbers represents second and first downs (for example, W/D $4^{th}$ and 1 on the 10 yard space move to $4^{th}$ and $0.3^{rd}$ on the 30 yard space. Next move from W/D $4^{th}$ and 0.3 on the 30 to W/D $0.3^{rd}$ and $2^{nd}$ on the 30 yard space.

On the other side 880 of the board are yard numbers in 10-yard increments 810 listed as numbers 10, 20, 30, 40, 40, 30, 20, 10. These numbers represents yard space. Like RB $2^{nd}$-and-1 on the 10 yard space moves to RB $2^{nd}$-and-$3^{rd}$ on your opponent's 40 yard space.

In another example in FIG. 8, the Guard (G) 862 starts off on the dark space 890 at the $2^{nd}$ and 1 (position 2'1) on the 20 yard line and can then move the Guard (G) 862 to the dark space 890 at the $2^{nd}$ and $0.4^{th}$ on the 40 yard space (position 2'4) or player Guard (G) 862 could move to Guard (G) 862 to the $2^{nd}$ and $0.3^{rd}$ on the 30 your yard space (position 2'3).

There is a left side of the QB and there is a right side of the QB. Like in chess you have the King side and the Queens side. So, in relation to football, you have the left Guard and the right Guard.

Electronic Banking

Figure 5:
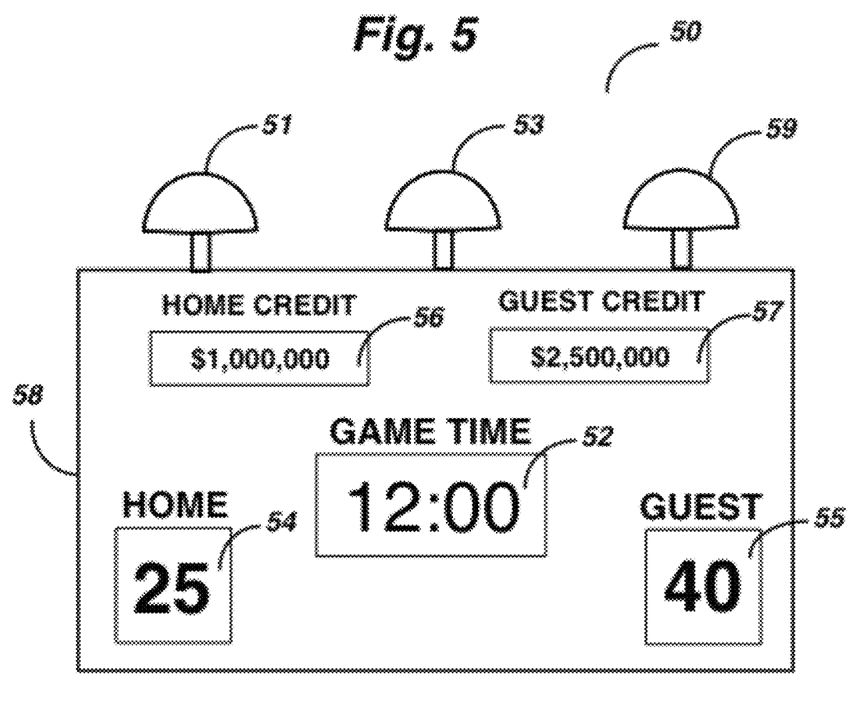
FIG. 5 illustrates a diagram of the game clock and game bank showing the game time, credit (dollars) for each player and play clock.

In one or more embodiments, the game utilizes a game clock 50—a timing and/or accounting like electronic device (FIG. 5). As shown in FIG. 5, the game clock 50 may include the total game time 52, which counts down from a set amount of time until the clock runs to zero minutes and seconds. The total game time 52 may be set to an initial game time of from 5-120 minutes. Typically, the total game time 52 may be set to an initial game time of 15, 30, 45 or 60 minutes and game begins when a game clock button 51 is pressed.

In one or more embodiments, the game clock 50 includes a play clock 54, 55 for each player. The play clock counts down automatically from the end of the previous player's turn end. Typically, once a player has moved his or her game piece, he or she will press a dedicated play resume button 53, which both resumes the total game time 52 countdown and the play clocks 54, 55.

Typically, a player, has 40 seconds from the end of a given play, or a 25-second interval after timeouts or other official stoppages, to make a move or one of the player's game pieces.

In one or more embodiments, the game clock 50 can also include a dedicated button 59 for enacting a timeout (TO) to stop the total game time 52 and the play clock 54, 55 from counting down. Typically, a single timeout will last for 20-360 seconds. In one or more embodiments, a single timeout will last for 20-60 seconds. Either player may call a timeout. In one or more embodiments, each player is allowed 1, 2, 3, 4, or more timeouts per half. In another embodiment, each player is allowed three timeouts per half.

In one or more embodiments, the game utilizes a game clock 50 which incorporates an accounting system in an electronic device for keeping track of each player's points 56, 57 (dollars) (see FIG. 5).

In one or more embodiments, each player receives $1,000,000, $2,000,000, $3,000,000, $4,000,000, $5,000,000, or more as a starting balance. In another embodiment, each player receives $4,300,000 as a starting balance. In one or more embodiments, each player may reset their balance only by registration of the game or application (app) or by use of a reset button on the game clock 50 for resetting the card back to the original amount. In one or more embodiments, a player may purchase additional dollars through an online store. In one or more embodiments, the game clock 50 may include one or more dedicated buttons for entering purchases such as a button for each of QB, FB, LB, RB, WR/DB, or FL. In another embodiment, the game clock 50 may include a set of buttons for each player so that each player has dedicated buttons for entering purchases. For example, when pressing the white/light player RB button, the white/light player will receive $450,000 from the black/dark player (and vice versa). Each time a player (team) tackles (captures) the other player's game piece, the tackling team takes that occupied space and receives a payment of the value of that player from the tackled/captured player (team) such as $350,000 for a Linebacker (LB).

Figure 6:
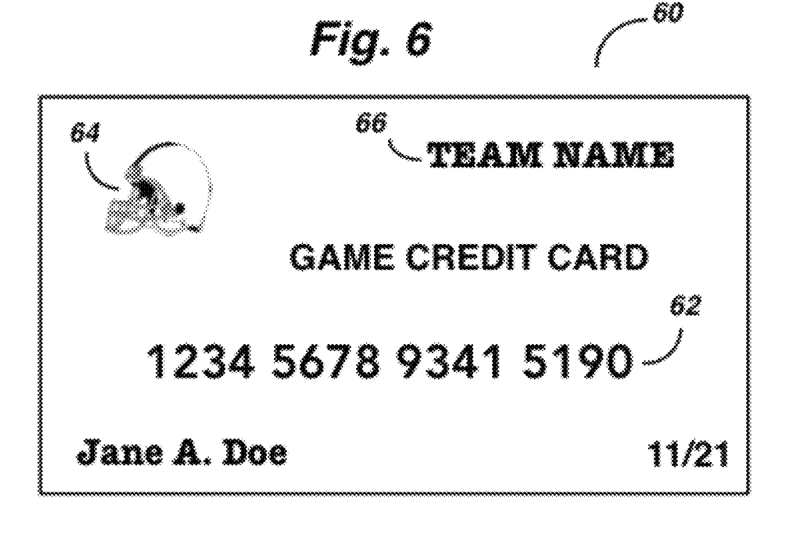
FIG. 6 illustrates a game card use for each player for payment and credit.

In one or more embodiments, each player receives a bank card 60 that is used with the Bank/game clock 50, as shown in FIG. 6. In one or more embodiments, each player receives a bank card 60 that is inserted into a slot within the Bank/game clock 50 for automatically entering information. The bank card 60 may use one or more methods of indicating and recording the amount of money (points or dollars) for each player. In one or more embodiments, the bank card 60 may include one or more of the player's name, team name 66, team logo 64, card number 62 and expiration date. In one or more embodiments, the bank card 60 is capable of recording any amount whether negative or positive.

Learning Transferable Skills

This board game teaches grade school students and adults the importance of thinking before making saving decisions. What mind power it take to increase your bank account balance from maintaining and recovering from a negative situation. The responsibility is you're alone to demonstrate self-motivation, delegation, time management, and prioritization, develop inner listening skills and leadership to think analytically.

Games of the invention may also include game scorecards, a cork board or other means for displaying the game board, game tokens, or pieces, game cards, or other means to mark progress on the game board, challenge reward symbols, such as star stickers or other reward symbols, score recording materials, such as a pencil or a pen and a scorecard or a digital or virtual scorekeeping device, a plurality of journals (one for each player), a game instruction APP/CD, and the like.

In one or more embodiments, the method may be embodied in an automated entertainment system that performs a series of functional processes to create a virtual game system and virtual other players who play the game according to the rules. Alternatively, a network system or ad hoc network can allow multiple human players to interact through an application ("app") that performs aspects of the methods described herein. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Each game 100,200 terminates with one winning player, or, alternatively, by "draw" in which case neither player wins. More specifically, the game 100,200 terminates at the sooner of one of four events: (a) a player captures an opposing player's Quarterback (QB) (e.g., "sacked" or "checkmate"); (b) the expiration of a predetermined amount of time; (c) a "draw" is declared; or (d) a player resigns or defaults.

The game 100,200 is won by the player who checkmates his or her opponent's Quarterback (QB) 36 within the allotted time. As indicated, the game 100,200 may also terminate at the expiration of a predetermined amount of time (e.g., five minutes, ten minutes, fifteen minutes, thirty minutes, sixty minutes, etc.). The length of the game may be varied depending upon the skill level of the players, or simply depending upon the time the players desire to play. If such a period of time expires, and the game 100,200 has not otherwise terminated, the game 100,200 is declared immediately terminated. The player with the highest total points, as determined by the cumulative point total value of pieces remaining at termination, is declared the winner. If the players have identical point totals, a draw is declared.

Running point (dollar) totals can also be kept during a series of games 100,200. For example, the first player to obtain a pre-determined total points after a series of games may be declared the winner.

It is also foreseen that the scoring system may be used in connection with a game that is terminated by one player checkmating the opposing player's Quarterback (QB). For example, in addition to receiving point values for the game pieces remaining "in play" at the game's termination (e.g. checkmate), as discussed above, the player who "checkmates" the opposing player's Quarterback (QB) may be awarded an additional set of points.

A draw automatically occurs when a player, having his or her Quarterback (QB) not in sack, is unable to make a legal move. A draw also occurs when all players agree to declare a draw. A draw also occurs automatically by rule when twenty-five consecutive moves have been made by each player or group of players, with neither player capturing any of the opposing player's playing pieces, and neither player's Front Line (FL) pieces being moved.

In one or more embodiments of the present invention, ability is given to players to accumulate points over several games played with several players. For example, in the beginning of the game if both the players have 100,000 points (dollars). After playing the game, the winner may have 150,000 points (dollars) and the looser may be left with 50,000 points (dollars). When players start with their next games, they may start with their previous cumulative scores. In further embodiments of the present invention, ability is given to players to set winning points that will be added to the winning player's score.

In one or more embodiments of the present invention, the game may be played at different levels of difficulty. In one embodiment, the game may be set such that a lost (tackled) piece is returned back to the board by default. That way, game always has all pieces (players) on the board so it becomes fun to keep capturing other team's pieces. In another embodiment, the game may be set such that a lost (tackled) piece is returned back to the board based on being bought by paying through points. In this method, the game will have pieces removed on the board over a period of time, so it becomes a little more challenging. In another embodiment, the game may be set such that lost (tackled) pieces cannot be bought. In this method, the game will have pieces removed on the board relatively quickly, so it becomes more challenging.

Figure 7:
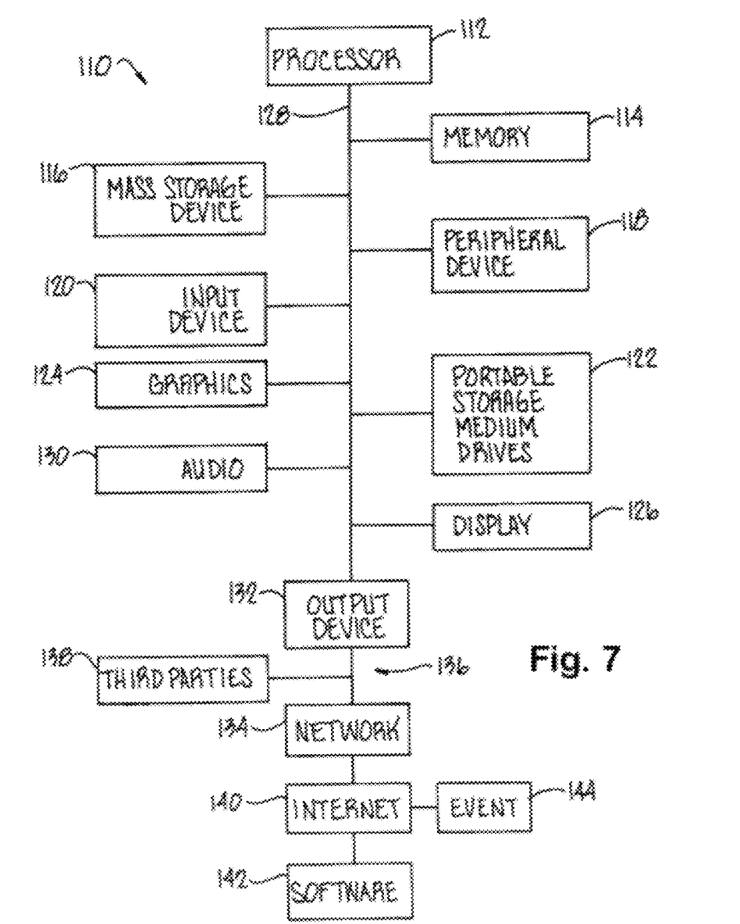
FIG. 7 illustrates a block diagram of an information handling system (IHS) to execute an application for playing the game, according to one or more embodiments.

In one or more embodiments, the game 100,200 may be adapted for play electronically, for example through the use of computer software and hardware including play between opposing players or multiple groups of players via the Internet. FIG. 7 illustrates a high-level block diagram of a computer system which is used, in one embodiment, to implement the method of the present invention. The computer system 110 of FIG. 7 includes a processor 112 and memory 114. Processor 112 may contain a single microprocessor, or may contain a plurality of microprocessors for configuring the computer system as a multi-processor system. Memory 114 includes an application program 115 which stores, in part, instructions and data for execution by processor 112. If the system of the present invention is wholly or partially implemented in software, including a computer program, memory 114 stores the executable code when in operation. Memory 114 may include banks of dynamic random access memory (DRAM) as well as high-speed cache memory.

In one or more embodiments, the system of FIG. 7 further includes a mass storage device 116, peripheral device(s) 118, input device(s) 120, portable storage medium drive(s) 122, a graphics subsystem 124 and a display 126. For purposes of simplicity, the components shown in FIG. 5 are depicted as being connected via a single bus 128. However, the components may be connected through one or more data transport means. For example, processor 112 and memory 114 may be connected via a local microprocessor bus, and the mass storage device 116, peripheral device(s) 118, portable storage medium drive(s) 122, and graphics subsystem 124 may be connected via one or more input/output (I/O) buses. Mass storage device 116, which is typically implemented with a magnetic disk drive or an optical disk drive, is a non-volatile storage device for storing data and instructions for use by processor 112. In another embodiment, mass storage device 116 stores the computer program implementing the method of the present invention for interfacing with a three-dimensional object for purposes of loading such program to memory 114. The game of the present invention also may be stored in processor 112.

Portable storage medium drive 122 operates in conjunction with a portable non-volatile storage medium, such as a floppy disk, or other computer-readable medium, to input and output data and code to and from the computer system of FIG. 7. In one embodiment, the game of the present invention for interfacing with a three-dimensional object is stored on a portable medium and is input to the computer system 110 via the portable storage medium drive 122. Peripheral device(s) 118 may include any type of computer support device, such as an input/output (I/O) interface, to add additional functionality to the computer system 110. For example, peripheral device(s) 118 may include a network interface card for interfacing computer system 110 to a network, a modem, and the like.

Input device(s) 120 provide a portion of a user interface. Input device(s) 120 may include an alpha-numeric keypad for inputting alphanumeric and other key information, or a pointing device, such as a mouse, a trackball, stylus or cursor direction keys. Such devices provide additional means for interfacing with the three-dimensional objects in the method of the present invention. In order to display textual and graphical information, the computer system 110 of FIG. 7 includes graphics subsystem 124 and display 126. Display 126 may include a cathode ray tube (CRT) display, liquid crystal display (LCD), other suitable display devices, or means for displaying, that enables a user to view a three-dimensional object. Graphics subsystem 124 receives textual and graphical information and processes the information for output to display 126. Display 126 can be used to display a three-dimensional object, component interfaces and/or display other information that is part of a user interface. The display 126 provides a practical application of the method of interfacing with a three-dimensional object of the present invention since the method of the present invention may be directly and practically implemented through the use of the display 126. The system 110 of FIG. 5 also includes an audio system 130. In one embodiment, audio system 130 includes a sound card that receives audio signals from a microphone that may be found in peripherals 118.

Additionally, the system of FIG. 7 includes output device(s) 132. Examples of suitable output devices include speakers, printers, and the like.

In one or more embodiments, the devices contained in the computer system of FIG. 7 are those typically found in general purpose computer systems, and are intended to represent a broad category of such computer components that are well known in the art. The system of FIG. 5 illustrates one platform which can be used for practically implementing the method of the present invention. Numerous other platforms can also suffice, such as Macintosh-based platforms available from Apple Computer, Inc., platforms with different bus configurations, networked platforms, multi-processor platforms, other personal computers, cell phones, tablets, PDAs, workstations, mainframes, navigation systems, and the like.

Alternative embodiments of the use of the method of the present invention in conjunction with the computer system 110 further include using other display means for the monitor, such as CRT display, LCD display, projection displays, or the like. Likewise, any similar type of memory, other than memory 114, may be used. Other interface means, in addition to the component interfaces, may also be used including alphanumeric keypads, other key information or any pointing devices such as a mouse, trackball, stylus, cursor or direction key.

In a further embodiment, the present invention also includes a computer program product which is a storage medium (media) having instructions stored thereon/in which can be used to program a computer to perform the method of interfacing of the present invention. The storage medium can include, but is not limited to, any type of disk including floppy disks, optical disks, DVD, CD ROMs, magnetic optical disks, RAMs, EPROM, EEPROM, magnetic or optical cards, or any type of media suitable for storing electronic instructions.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems and user applications. Ultimately, such computer readable media further includes software for performing the game of interfacing of the present invention.

It is noted that the present invention may also be implemented in hardware or circuitry which embodies the logic and processing disclosed herein, or alternatively, the present invention may be implemented in software in the form of a computer program stored on a computer readable medium such as a storage device. Furthermore, combinations of embodiments of the invention may be divided into specific functions and implemented on different individual computer processing devices and systems which may be interconnected to communicate and interact with each other. Dividing up the functionality of the invention between several different computers is meant to be covered within the scope of the invention.

As illustrated in FIG. 7, computer system 110 is coupled to network 134, such as the Internet 140, across communications lines 136. Preferably, the communications lines 136 are dedicated lines (e.g., LAN, WAN, internet connection, WiFi, Bluetooth, dedicated lease line, DSL) with a frame relay (or point-to-point) connection. Computer system 110 may be directly linked to third party vendees (e.g., other game sites) with the software of the present invention rather than communicating with computer system 110 through the Internet. The third party computer systems 138 are, for example, a mainframe or PCs of at least XX486 processing ability (e.g., Pentium CPU) having one gigabyte drive, 16 megabytes of RAM (random access memory), with typical I/O accessories including a keyboard, display, mouse and printer, or similar workstation. Each of the third party computer systems 138 and system 110 (specifically the output device or server 132) also have a modem (e.g., CSDSU, T1 communication, DSL or cable modems) for coupling to the communication line 136 and enabling communications between system 110 and third party computer system 138.

Mass storage device or server 116, output device or server 132 and memory 114 may be implemented by one digital processor 112. In that case, consolidation, scheduling, initial and subsequent segmenting of customers and execution of working programs are accomplished through the one processor running the inventive software. Neural networks may be employed to operate on mass storage device 116 and portable storage medium drives 122 to learn each individual player's purchasing game behavior and characteristics and segment players accordingly. In using the present invention, the customer may be assisted by a third party. The customer need not be the person who actually enters information into the system.

Further, instead of the neural networks, a multiple regression correlation based on player data in devices 116 and 122 may be used for segmenting players and customers. Alternatively, rule based expert systems may be similarly employed in the present invention to provide dynamic player behavioral and purchasing segmentation.

In a further example as more fully described below, the invention may be employed on the Internet 1400. In this event, the processor 112 is operative to transfer the application program 115 out of the memory 114 and display an Internet graphical user interface (GUI) on the display 126 and execute graphical Internet protocol programs, to connect said Internet 140 and transfer data between said electronic chess game and said graphical user interface. A website can be created with a home page with topic selections and links (e.g., Hypertext HTML technology) to the application program 115 triggering questionnaires, initiations of games and information. In particular, for each topic selection there is a respective hyperlink to the application program 115 and optionally an event 144 for initiating program 115. Upon the player's selection of a topic from the home page, the present invention applies the linked event 144, if any. If the criteria of the event 144 are met (or if there is no initiating event 144), then the present invention executes the corresponding application program 115. This results in the application program 115 contents being transmitted online to the user.

In another embodiment, the present inventive system 100,200 is based on a non-networked computerized device, such as a cell phone or tablet.

It must be noted that, as used in this specification and the appended claims, the singular forms "a," "an" and "the" include plural referents unless the content clearly dictates otherwise. Thus, for example, reference to a "colorant agent" includes two or more such agents.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

As will be appreciated by one having ordinary skill in the art, the methods and compositions of the invention substantially reduce or eliminate the disadvantages and drawbacks associated with prior art methods and compositions.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

While it is apparent that the illustrative embodiments of the invention herein disclosed fulfill the objectives stated above, it will be appreciated that numerous modifications and other embodiments may be devised by one of ordinary skill in the art. Accordingly, it will be understood that the appended claims are intended to cover all such modifications and embodiments, which come within the spirit and scope of the present invention.

What is claimed is:

1. A game comprising:
   a game board having a rectangular grid array annotated with football field markings;
   game pieces having football related shapes; and
   an electronic banking/game clock (EBGC) device that enables timed use and scoring of the game pieces on the game board during game play, the EBGC device comprising:
      a game clock comprising: (i) a game time clock that displays remaining time until conclusion of a game; and (ii) at least one play clock that displays a countdown of a predetermined number of seconds from an end of a previous player's turn;
      a score-keeping user interface comprising two score displays for competing players; and
      an electronic information system communicatively coupled to the two score displays, the electronic information system records values for each game piece that is removed from the game board for each player, computes a change in a player score based on the values, and displays the player score on a corresponding one of the two score displays;
      a housing to which the game clock and the score-keeping user interface are attached; and
      one or more dedicated controls attached to the housing that are responsive to manual user entry to affect operation of the game clock.

2. The game of claim 1, wherein:
   the game board further comprises an eight-by-eight checkerboard-style game board having first and second ends, a pair of opposed sides, and a playing surface comprising a plurality of alternating dark and light field squares to form a checkerboard pattern; the squares forming a plurality of rows extending between the sides, and a plurality of columns extending between the ends; wherein the game board further comprises a row made up of a single space creating a first End Zone and a second End Zone space that is immediately adjacent the first and second end of the game board thereby creating a total of sixty-four field squares and two End Zone rectangles;
   the game pieces comprise two sets of distinguishable game pieces, including a set of light colored pieces for one of the opposed players, and a set of dark colored pieces for the other of the opposed players; each the set of game pieces consisting of one Quarterback (QB), one Fullback (FB), two Wide Receivers/Defensive Backs (WR/DB), two Running Backs (RB), two Linebackers (LB), and eight Front Line (FL) pieces;
   the Quarterback (QB), the Fullback (FB), the Running Backs (RB), the Linebackers (LB), and the Wide Receivers/Defensive Backs (WR/DB) of the set of light-colored game pieces having initial locations in respective squares in the first row of squares immediately adjacent the first End Zone of the first end of the gameboard; the Quarterback (QB), the Fullback (FB), the Running Backs (RB), the Linebackers (LB), and the Wide Receivers/Defensive Backs (WR/DB) of the set of dark-colored game pieces having initial locations in respective squares in the first row of squares immediately adjacent the first End Zone of the first end of the gameboard in mirrored relation to the initial locations of the light-colored game pieces; and
   the light-colored Front Line (FL) pieces having initial locations in the respective squares in the second row adjacent the first end; the dark-colored Front Line (FL) pieces having initial locations in the respective squares in the second row adjacent the second end.

3. The chess game of claim 2, wherein the plurality of alternating dark and light field squares to form a checkerboard pattern are light and dark shades of green and the game board include insignia for yardage.

4. The game of claim 1, wherein the game clock enables setting the game time clock to a total game time may be set to an initial game time of from 5-120 minutes and the at least one play clock to a count down from 20-360 seconds.

5. The game of claim 1, wherein the game clock further comprises a dedicated button as an interface for enacting a timeout (TO) to stop the game time clock and the at least one play clock from counting down.

6. The game of claim 1, wherein the score-keeping user interface of the EBGC device comprises one or more dedicated buttons for entering respective values of each type of game piece.

7. The game of claim 1, further comprising two or more bank cards that are insertable in a slot in the EBGC device, wherein the score-keeping user interface of the EBGC device receives information contained on an inserted bank card and adjusts one of the player scores based on the information.

8. A method comprising:
   providing a game board having a rectangular grid array annotated with football field markings;
   providing game pieces having football related shapes;
   timing use of the game pieces on the game board during game play using an electronic banking/game clock (EBGC) device by:
      displaying remaining time until on a display of a game time clock of the EBGC device; and
      displaying a countdown of a predetermined number of seconds from an end of a previous player's turn on at least one display of a play clock of the EBGC device; and
   recording values, in an information system of the EBGC device, for each game piece that is removed from the game board for each player;
   computing, by the information system, a change in a player score based on the values; and
   displaying the player score on a corresponding one of two score displays of the EBGC device.

9. The method of claim 8, wherein:
   the game comprises: an eight-by-eight checkerboard-style game board having first and second ends, a pair of opposed sides, and a playing surface comprising a plurality of alternating dark and light field squares to form a checkerboard pattern; the squares forming a plurality of rows extending between the sides, and a plurality of columns extending between the ends; wherein the game board further comprises a row made up of a single space creating a first End Zone and a second End Zone space that is immediately adjacent the first and second end of the game board thereby creating a total of sixty-four field squares and two End Zone rectangles; and the game pieces comprise two sets of distinguishable game pieces, including a set of light colored pieces for one of the opposed players, and a set of dark colored pieces for the other of the opposed players; each the set of game pieces consisting of one Quarterback (QB), one Fullback (FB), two Wide Receivers/Defensive Backs (WR/DB), two Running Backs (RB), two Linebackers (LB), and eight Front Line (FL) pieces;

the method further comprises:

placing each player's set of playing pieces on the game board so that the Quarterback (QB), the Fullback (FB), the Running Backs (RB), the Linebackers (LB), and the Wide Receivers/Defensive Backs (WR/DB) of the set of light-colored game pieces having initial locations in respective squares in the first row of squares immediately adjacent the first End Zone of the first end of the gameboard; the Quarterback (QB), the Fullback (FB), the Running Backs (RB), the Linebackers (LB), and the Wide Receivers/Defensive Backs (WR/DB) of the set of dark-colored game pieces having initial locations in respective squares in the first row of squares immediately adjacent the first End Zone of the first end of the gameboard in mirrored relation to the initial locations of the light-colored game pieces; and the light-colored Front Line (FL) pieces having initial locations in the respective squares in the second row adjacent the first end; the dark-colored Front Line (FL) pieces having initial locations in the respective squares in the second row adjacent the second end;

the players taking turns consisting of one or more alternating moves of the pieces; the alternating moves continuing until one player places the opposing player's Quarterback (QB) in sacked or checkmate, or the expiration of a predetermined period of time; and the moves of the Quarterback (QB), the Fullback (FB), the Running Back (RB), the Wide Receiver/Defensive Back (WR/DB), the Linebacker (LB) and the Front Line (FL) being conducted according to the rules of conventional chess except that a player may move the Quarterback (QB) into the End Zone.

10. The method of claim 9, wherein each of the moves must be taken within forty seconds.

11. The method of claim 9, further comprising one castling move per game by each the player.

12. The method of claim 9, further comprising promoting the Front Line (FL) pieces upon reaching rank.

13. The method of claim 9, further comprising assigning dollar values to the playing pieces for determining a winner at the expiration of the predetermined period of time.

14. The method of claim 13, further comprising declaring a winner as the player with the highest the dollar value at the expiration of the predetermined period of time.

15. The method of claim 9, further comprising assigning dollar values to the playing pieces in response to determining a winner upon termination of the game by checkmate.

16. The method of claim 15, further comprising declaring a winner as the player with the highest dollar value upon the checkmate.

17. The method of claim 8, further comprising receiving respective values of each type of game piece via one or more dedicated buttons of a score-keeping user interface of the EBGC device.

18. The method of claim 8, further comprising:

receiving information contained on a bank card inserted in the EBGC device; and adjusting one of the player scores on the corresponding one of the two score displays based on the information.

* * * * *